Dec. 23, 1958

O. KORNEI 2,866,011

MAGNETIC TRANSDUCER HEAD

Filed July 13, 1954

INVENTOR.
OTTO KORNEI
BY
Eber J. Hyde
ATTORNEY

United States Patent Office 2,866,011
Patented Dec. 23, 1958

2,866,011

MAGNETIC TRANSDUCER HEAD

Otto Kornei, Cleveland Heights, Ohio, assignor to Clevite Corporation, Cleveland, Ohio, a corporation of Ohio Application July 13, 1954, Serial No. 442,940
6 Claims. (Cl. 179—100.2)

This invention pertains to a magnetic transducer head for magnetically recording on and reproducing from a magnetizable record medium such as tape, and is particularly useful for recording and reproducing very high frequencies. Maximum usefulness is achieved with the head of this invention in the recording and reproducing of television signals as the head will record and reproduce such information with by far the lowest tape speed of any transducer head heretofore known.

Another object of the invention is to provide a head with a nonmagnetic transducer gap much shorter than that which can be obtained with heretofore known gap spacer means.

An object of the invention is to provide a magnetic transducer head which will record and reproduce magnetic signals of a very high frequency using a magnetic recording medium which moves past the head at a reasonably low speed.

A further object of the invention is to provide a magnetic transducer head in combination with a moving record member such that the wave length of the highest frequency signal which can be recorded and reproduced is on the order of one ten thousandths of an inch, or shorter.

Another object of the present invention is to provide a magnetic transducer head for recording and reproducing television programs on magnetic material.

Another object of the invention is to provide a method of rapidly, consistently and inexpensively producing the gap spacers in magnetic transducer heads.

Other and further objects and advantages of the present invention will be apparent from the following description of the preferred embodiment thereof, which is illustrated in the accompanying drawing and described in detal in the following description.

With reference to the drawing there is shown in Figure 1 a side view of a magnetic transducer head, with portions broken away.

It has been known that a magnetic transducer head will reproduce higher frequency signals from a record member moving at a given speed, i. e., shorter wave lengths, if its transducer gap is kept to a minimum. In the past thin shims of aluminum or bronze foil and the like have been positioned between the confronting end faces of the two pole pieces which faces are generally used to define the boundaries of the physical gap. These foil shims have been made thinner and thinner in an effort to produce heads which will record higher frequencies, until foil shims on the order of about 0.2 mil have successfully been used. Foil shims this thin can be employed by highly skilled technicians but for mass production of an inexpensive head the thin foil is not very successful since it is apt to wrinkle, producing a head with an irregular gap much longer than intended. Furthermore, foils which are less than about .0002 inch in thickness are extremely difficult to produce, and about 0.0001 inch represents the lowest limit of anything at all practical.

With the growing demand for the magnetic recording of very high frequencies, including television signals, it has become more and more important to provide a magnetic transducer head which can meet these requirements in conjunction with a recording medium moving at a reasonable speed. This calls for a transducer head which has both high resolving power and low losses. One form of the present invention makes it possible for instance, to record and reproduce frequencies up to four megacycles per second on recording tape moving at a speed of 20 feet per second. This corresponds to a minimum recorded wave length of only 60 micro inches.

In an effort to produce a head for the recording and reproducing of very high frequencies thinner and thinner foil shims were used in the past. When the thinnest available shims were still not yet successful, heads with no gap spacers at all, that is, with a "zero-gap" were constructed. In this case one depended for the formation of the nonmagnetic gap on the always present minute surface roughness, oxide layers, etc. on the confronting pole faces. It was found, however, that the performance of heads constructed in this manner was very inconsistent and the obtainable signal-to-noise ratio so low that no advantage could be taken of any improvement of the frequency response.

Electroplating methods have been used to obtain the gap spacer. This method is not considered to be suitable because of the well known "edge effects," that is, the thickening of the plating along the edges of a plated area. This effect becomes especially detrimental in the case of plating very small areas.

It was only through the construction of heads in accordance with this invention that a satisfactory solution was found by using gap dimensions between the so-called zero-gaps and the thinnest available gap shims.

Figures 3, 4:
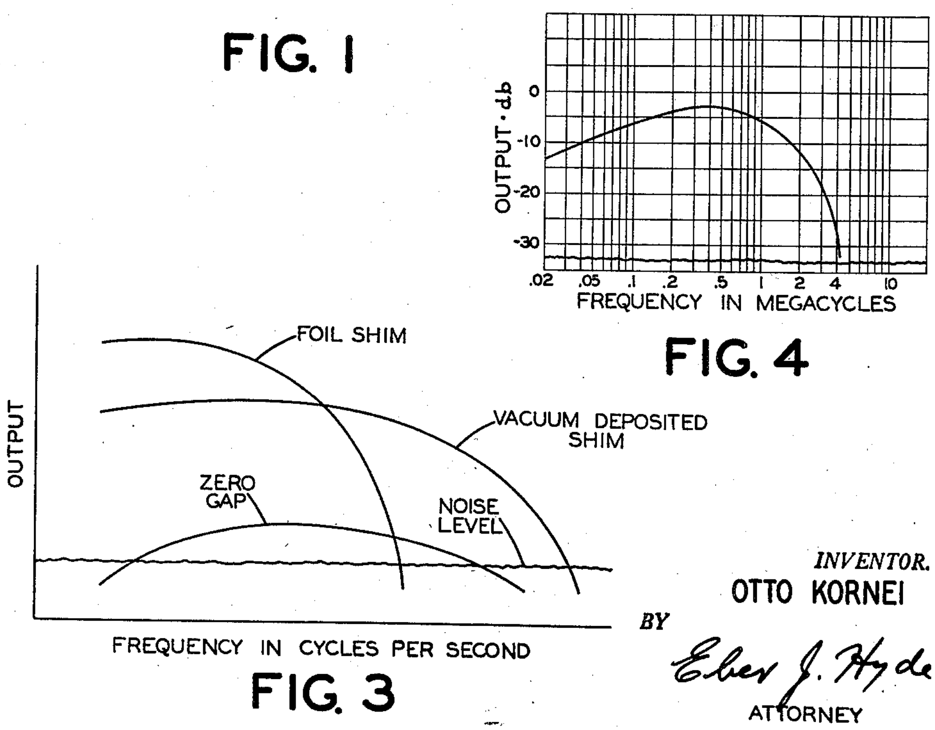
Figure 3 is a graph showing, for a given tape speed, the relative output curves of two types of prior art heads compared to the output curve for the head of the present invention.
Figure 4 is a graph showing the output curve of a head made in accordance with the present invention.

To illustrate the situation, Fig. 3 shows, in a semi-schematic manner, three typical output versus frequency response curves of three different magnetic transducer heads. It can be seen that a head with a conventional shim gap spacer yields a rather high output but is deficient in the upper frequency range. The "zero-gap" head shows a desirable flat response curve which, however, is of such low level above the noise that it is practically unusable. A head with a very thin, yet finite, vacuum deposited gap spacer gives an extended response of sufficiently high level above the noise.

An actually measured output versus frequency response curve of a typical head constructed in accordance with the invention is shown in Fig. 4. The tape was commercial iron oxide coated tape, on a plastic base, moving at a speed of 240 inches per second.

The head of the present invention comprises a first and a second pole piece assembly, each having two planar end faces. Means are provided for holding the pole pieces in aligned, confronting, closely spaced relationship to form a substantially closed magnetic path with one pair of the confronting end faces defining a transducing gap in the substantially closed magnetic path. Either one or both of the two confronting end faces which define the gap has intimately secured to it a film of vacuum deposited nonmagnetic material less than five microns thick, and coil means are wrapped about the closed magnetic path.

Figures 1, 2:
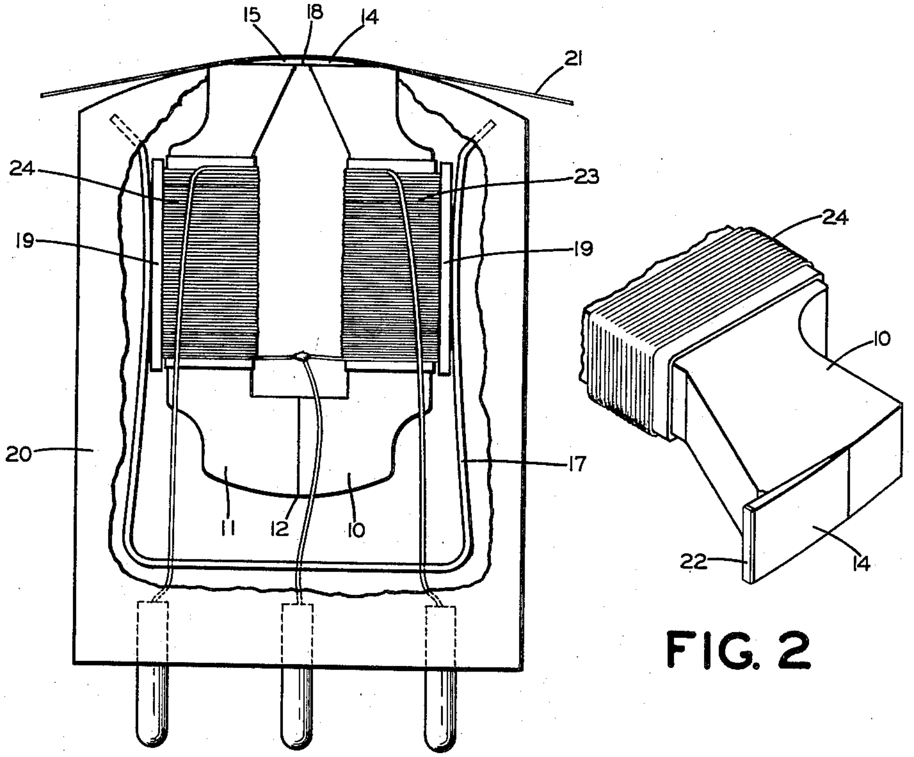
Figure 2 is an isometric view showing a portion of one pole piece and coil subassembly, with one end face of the pole piece coated in accordance with this invention.

With reference to the drawings there is shown in Figure 1 a magnetic transducer head comprising a first pole piece 10 and a second pole piece 11, each having a planar end face 12. Each of the pole piece assemblies preferably comprises a core of ferrite material as described in my co-pending application Serial No. 340,241, now Patent 2,711,945, to which is secured a metallic pole shoe 14 or 15, and a coil 23, 24 is wound about each core 10, 11. The two pole piece assemblies are held as units in confronting closely spaced relationship by a spring clip 17 exerting force through two pressure pads 19 to form a substantially closed magnetic path with the end faces of the two pole shoes defining a transducing gap 18 and the other pair of end faces 12 forming a butt joint.

Means other than spring clips may, of course, be employed to tightly hold the two pole piece assemblies 10, 11 together. One preferred method of securing the various head components in their mutual relationship is to cast the head in hardenable resin which is identified by reference character 20. The head illustrated uses both the spring clip 17 and hardened plastic material 20 to form a stable structure. A record member 21 is adapted to move across the transducing gap 18 in contact with the plastic 20 and the exposed pole shoes 14, 15 in a well known manner. The record member preferably is comprised of a plastic film carrying a thin film of magnetizable iron oxide, or having the iron oxide uniformly dispersed into the plastic material.

At least one of the two pole shoes 14, 15 which define the transducing gap 18 has intimately secured to it a very thin film 22 of vacuum deposited material which is less than five microns thick, and coil means 23 and 24 are wound about the two pole pieces 10, 11 and connected together in a well known manner.

The thin film 22 which is deposited on at least one of the end faces of one of the pole shoes 14 and 15 is most important to the successful operation of the transducer head. With this film, for the first time, the head has become practical for the recording and reproducing of extremely short wave lengths. The film fills the most important thickness range which has hitherto existed between a "zero" gap and the thinnest gap spacer which can be produced by conventional means, such as rolling or the like. This thickness range extends downward from about 5 microns. A gap dimension of .5 micron was used in obtaining the curve shown in Fig. 4. The film 22 is nonmagnetic and may be comprised for instance of aluminum, beryllium, gold, chromium or titanium, or nonmetals such as boron, silicon, quartz or silicon monoxide, and is applied to the end face of the pole shoe by a vacuum evaporation technique. A large number of the pole shoes may be placed in an enclosure, a vacuum on the order of $10^{-3}$ mm to $10^{-5}$ mm of mercury is established within the enclosure, and a small amount of the material to be deposited on the end face is vaporized, usually from a tungsten filament supporting the supply of material to be deposited. As is well known the pole shoes should be so positioned within the enclosure that the end faces to be coated face the supply of material to be vaporized.

Details of the procedure need not be recounted here since the vacuum evaporation technique per se is a well known art and does not form part of the invention.

It has been found especially beneficial to form the required gap length, i. e., the total film thickness between the confronting faces of the transducer head, by depositing substantially one-half of the total thickness on each of the faces. Two advantages are gained in this way. First, the thinner film can be more safely deposited, with a greatly reduced danger of peeling off and of overheating the pole pieces during the operation. Secondly it has been found that the tightly adhering film layers offer a wear protection for the gap forming pole shoe edges, thus extending the useful life of the head. If the required film thickness cannot be deposited by a single evaporation process, several consecutive evaporations may be used.

One of the special features of using vacuum deposited gap spacers resides in the fact that the spacer can be deposited as the very last operation prior to the assembly of the head. This gives the advantage that the extremely critical final alignment and polishing (as described in co-pending application Serial No. 340,241, now Patent 2,711,945) of the pole faces can be done without the danger of subsequent disturbance in any other mechanical operation. It has the further advantage that the handling of the very delicate spacer is reduced to a minimum after it has been deposited, thus avoiding possible damage.

While in the foregoing description and in the accompanying drawing there has been disclosed a specific preferred embodiment of the present invention, it is to be understood that various modifications, omissions and refinements which depart from the disclosed embodiment may be adopted without departing from the spirit and scope of this invention.

I claim:

1. A magnetic transducer device for transducing magnetic records on a magnetizable record medium, comprising a head formed of a first and a second pole piece each having two planar end faces, means securing said first and second pole pieces together in aligned confronting closely spaced relationship to form a substantially closed magnetic path with one pair of confronting end faces defining a transducing gap in said substantially closed magnetic path across which said record medium moves during a transducing operation, at least one face of said pair of confronting end faces defining said transducing gap having intimately secured to it a film of vacuum deposited nonmagnetic material less than 5 microns thick filling said gap, and coil means wound around a portion of said magnetic path.

2. A magnetic transducer head as set forth in claim 1, further characterized by both of said pair of confronting end faces defining said transducing gap having intimately secured thereto a film of vacuum deposited nonmagnetic material less than 5 microns thick.

3. A magnetic transducer head as set forth in claim 1, further characterized by said vacuum deposited nonmagnetic material being selected from the group consisting of aluminum, beryllium, gold, chromium and titanium.

4. A magnetic transducer device for transducing magnetic records on a magnetizable record medium, comprising a head formed of a first and a second pole piece each having two planar end faces, means securing said first and second pole pieces together in aligned confronting closely spaced relationship to form a substantially closed magnetic path with one pair of confronting end faces defining a transducing gap in said substantially closed magnetic path across which said record medium moves during a transducing operation, and vacuum deposited, nonmagnetic material less than 5 microns thick deposited on and secured to at least one face of the pair of confronting end faces which defines said transducing gap, said non-magnetic material completely filling said transducing gap, and coil means wound around a portion of said magnetic path.

5. A magnetic transducer head comprising a core of non-metallic magnetically soft material defining a magnetic circuit which includes a relatively wide gap, metallic pole shoe means intimately connected to said core on either side of said relatively wide gap with a pair of confronting end faces defining a relatively narrow transducing gap, and vacuum deposited, nonmagnetic material less than 5 microns thick deposited on and secured to at least one face of said pair of confronting end faces completely filling said transducing gap between said pole shoe means, and coil means wound around a portion of said magnetic path.

6. A magnetic transducer device for transducing magnetic records on a magnetizable record medium, comprising a head formed of a first and a second pole piece each having two planar end faces, means securing said first and second pole pieces together in aligned confronting closely spaced relationship to form a substantially closed magnetic path with one pair of confronting end faces defining a transducing gap in said substantially closed magnetic path across which said record medium moves during a transducing operation, at least one face of said pair of confronting end faces defining said transducing gap having intimately secured to it a film of vacuum deposited nonmagnetic material selected from the group consisting of boron, silicon, silicon monoxide, and quartz less than 5 microns thick filling said gap, and coil means wound around a portion of said magnetic path.

References Cited in the file of this patent

UNITED STATES PATENTS

| | | |
|---|---|---|
| 2,585,932 | Hare | Feb. 19, 1952 17' |
| 2,711,945 | Kornei | June 28, 1955 34 |
| 2,769,036 | Selsted | Oct. 30, 1956 17' |

FOREIGN PATENTS

| | | |
|---|---|---|
| 669,458 | Great Britain | Apr. 2, 1952 |
| 706,267 | Great Britain | Mar. 24, 1954 |